(12) United States Patent
Chen et al.

(10) Patent No.: US 8,243,016 B2
(45) Date of Patent: Aug. 14, 2012

(54) OPTICAL POINTING DEVICE WITH INTEGRATED OPTICAL COMPONENTS AND RELATED ELECTRONIC APPARATUS

(75) Inventors: Hui-Hsuan Chen, Hsin-Chu (TW); Tien-Chia Liu, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 518 days.

(21) Appl. No.: 12/467,298

(22) Filed: May 17, 2009

(65) Prior Publication Data

US 2010/0060578 A1 Mar. 11, 2010

Related U.S. Application Data

(60) Provisional application No. 61/094,416, filed on Sep. 5, 2008.

(51) Int. Cl.
*G06F 3/033* (2006.01)

(52) U.S. Cl. ......... 345/156; 345/163; 345/166; 345/173

(58) Field of Classification Search ................ 345/156, 345/163, 166, 173, 175
See application file for complete search history.

(56) References Cited

U.S. PATENT DOCUMENTS

| | | | | |
|---|---|---|---|---|
| 5,801,681 | A * | 9/1998 | Sayag | 345/157 |
| 5,943,233 | A * | 8/1999 | Ebina et al. | 700/85 |
| 6,833,825 | B1 * | 12/2004 | Farag et al. | 345/158 |
| 2002/0030668 | A1 * | 3/2002 | Hoshino et al. | 345/175 |
| 2003/0063256 | A1 * | 4/2003 | Inuzuka | 351/177 |
| 2004/0233170 | A1 * | 11/2004 | Kang | 345/166 |
| 2006/0007148 | A1 * | 1/2006 | Theytaz et al. | 345/163 |
| 2007/0057929 | A1 * | 3/2007 | Xie | 345/175 |

FOREIGN PATENT DOCUMENTS

| | | |
|---|---|---|
| CN | 2658849 Y | 11/2004 |
| CN | 2840182 Y | 11/2006 |
| CN | 200990070 Y | 12/2007 |
| CN | 201063156 Y | 5/2008 |

* cited by examiner

*Primary Examiner* — Amare Mengistu
*Assistant Examiner* — Koosha Sharifi-Tafreshi
(74) *Attorney, Agent, or Firm* — Winston Hsu; Scott Margo

(57) ABSTRACT

According to the claimed invention, an optical pointing device includes a cover having a transparent part, and a sensing component installed inside the cover. The sensing component includes a light emitting module for emitting light, and a light sensing module for sensing light transmitted from the transparent part. The optical pointing device further includes a light guiding component installed between the sensing component and the cover. The light guiding component includes a reflecting part for reflecting the light emitted from the light emitting module to the transparent part, and a condensing part integrated with the reflecting part monolithically for condensing light transmitted from the transparent part to the light sensing module. The light emitted from the light emitting module is reflected to the transparent part by the reflecting part and then reflected back to the transparent part and the condensing part by a shelter disposed above the cover.

21 Claims, 4 Drawing Sheets

OPTICAL POINTING DEVICE WITH INTEGRATED OPTICAL COMPONENTS AND RELATED ELECTRONIC APPARATUS

CROSS REFERENCE TO RELATED APPLICATIONS

This application claims the benefit of U.S. Provisional Application No. 61/094,416, filed on Sep. 5, 2008 and entitled "Optical Screen Pointer", the contents of which are incorporated herein by reference.

BACKGROUND OF THE INVENTION

1. Field of the Invention

The present invention relates to an optical pointing device and a related electronic apparatus, and more particularly, to an optical pointing device with integrated optical components and a related electronic apparatus.

2. Description of the Prior Art

In general, a pointing device is widely utilized for an input board, a trackball, a mouse, a ray gun, a joystick, and so on. For example, the pointing device, such as the ray gun or the joystick, is an interactive input interface of a TV-game machine. The operational principle of an optical pointing device is introduced as follows. Light is emitted through optical components and outside a housing of the optical pointing device. At this time, a shelter moving on the housing reflects the light emitting out of the housing back to the optical pointing device, and other optical component can guide the light to a sensor. The sensor can trace reflected light at different positions, and a processor electrically connected to the sensor can analyze the image corresponding to the sensing result for calculating motion of the shelter, such as a user's finger.

However, the conventional optical pointing device has separate optical components, such as a light pipe, a prism component, and a lens component, for guiding light resulting in complicated optical structure so as to increase assembly tolerance and manufacturing cost. Furthermore, there is a need to apply an additional fixing structure for fixing the optical components and light source inside the housing also resulting in complicated structure. In addition, there is a need to embed a transparent component in the housing where the light is capable of passing through also resulting in complicated structure so as to increase assembly tolerance and manufacturing cost. Thus, the conventional optical pointing device has important issues of complicated optical structure, assembly tolerance, and manufacturing cost.

SUMMARY OF THE INVENTION

According to the claimed invention, an optical pointing device includes a cover having a transparent part where light passes through, and a sensing component installed inside the cover. The sensing component includes a light emitting module for emitting light, and a light sensing module for sensing light transmitted from the transparent part so as to generate a corresponding sensing signal. The optical pointing device further includes a light guiding component installed between the sensing component and the cover. The light guiding component includes a reflecting part for reflecting the light emitted from the light emitting module to the transparent part, and a condensing part integrated with the reflecting part monolithically for condensing light transmitted from the transparent part to the light sensing module. The light emitted from the light emitting module is reflected to the transparent part by the reflecting part and then reflected back to the transparent part and the condensing part by a shelter disposed above the cover, and the condensing part is for condensing the light transmitted from the transparent part to the light sensing module.

According to the claimed invention, an electronic apparatus includes an optical pointing device having a cover having a transparent part where light passes through, and a sensing component installed inside the cover. The sensing component includes a light emitting module for emitting light, and a light sensing module for sensing light transmitted from the transparent part so as to generate a corresponding sensing signal. The optical pointing device further includes a light guiding component installed between the sensing component and the cover. The light guiding component includes a reflecting part for reflecting the light emitted from the light emitting module to the transparent part, and a condensing part integrated with the reflecting part monolithically for condensing light transmitted from the transparent part to the light sensing module. The electronic apparatus further includes a control unit electrically connected to the light sensing module for controlling operation of the electronic apparatus according to the sensing signal transmitted from the light sensing module. The light emitted from the light emitting module is reflected to the transparent part by the reflecting part and then reflected back to the transparent part and the condensing part by a shelter disposed above the cover, and the condensing part is for condensing the light transmitted from the transparent part to the light sensing module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
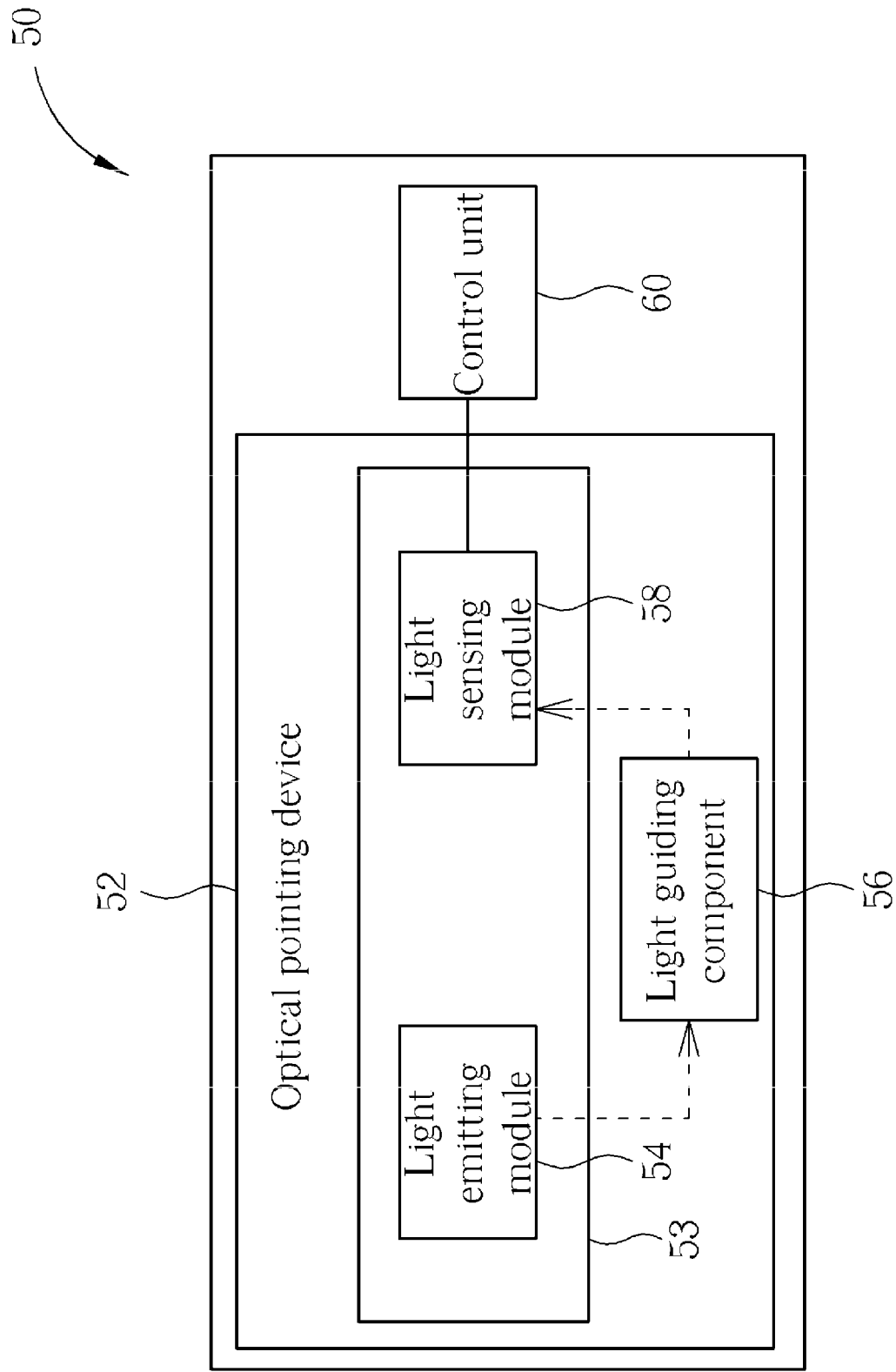
FIG. 1 is a functional block diagram of an electronic apparatus according to a preferred embodiment of the present invention.

Please refer to FIG. 1. FIG. 1 is a functional block diagram of an electronic apparatus 50 according to a preferred embodiment of the present invention. The electronic apparatus 50 includes an optical pointing device 52, which can be an optical joystick, an optical touch device, and so on. The optical pointing device 52 includes a sensing component 53 and a light guiding component 56. The sensing component 53 includes a light emitting module 54 and a light sensing module 58. The light emitting module 54 is for emitting light, such as laser beams or infrared rays. The light guiding component 56 is for modulating the light emitted by the light emitting module 54 so as to project the light out of the optical pointing device 52 and to guide light reflected back to the optical pointing device 52 to the light sensing module 58. The light sensing module 58 is for sensing the light transmitted from the light guiding component 56 so as to generate a corresponding sensing signal. The light sensing module 58 can be a sensing chip. The electronic apparatus 50 further includes a control unit 60 electrically connected to the light sensing module 58 for controlling operation of the electronic apparatus 50 according to the sensing signal transmitted from the light sensing module 58. The control unit 60 can be a hardware, software, or firmware. For example, the light sensing module 58 can trace reflected light at different positions, and the control unit 60 electrically connected to the light sensing module 58 can analyze the image corresponding to the sensing result for calculating motion of a shelter sheltering the optical pointing device 52, such as a user's finger.

Figure 2:
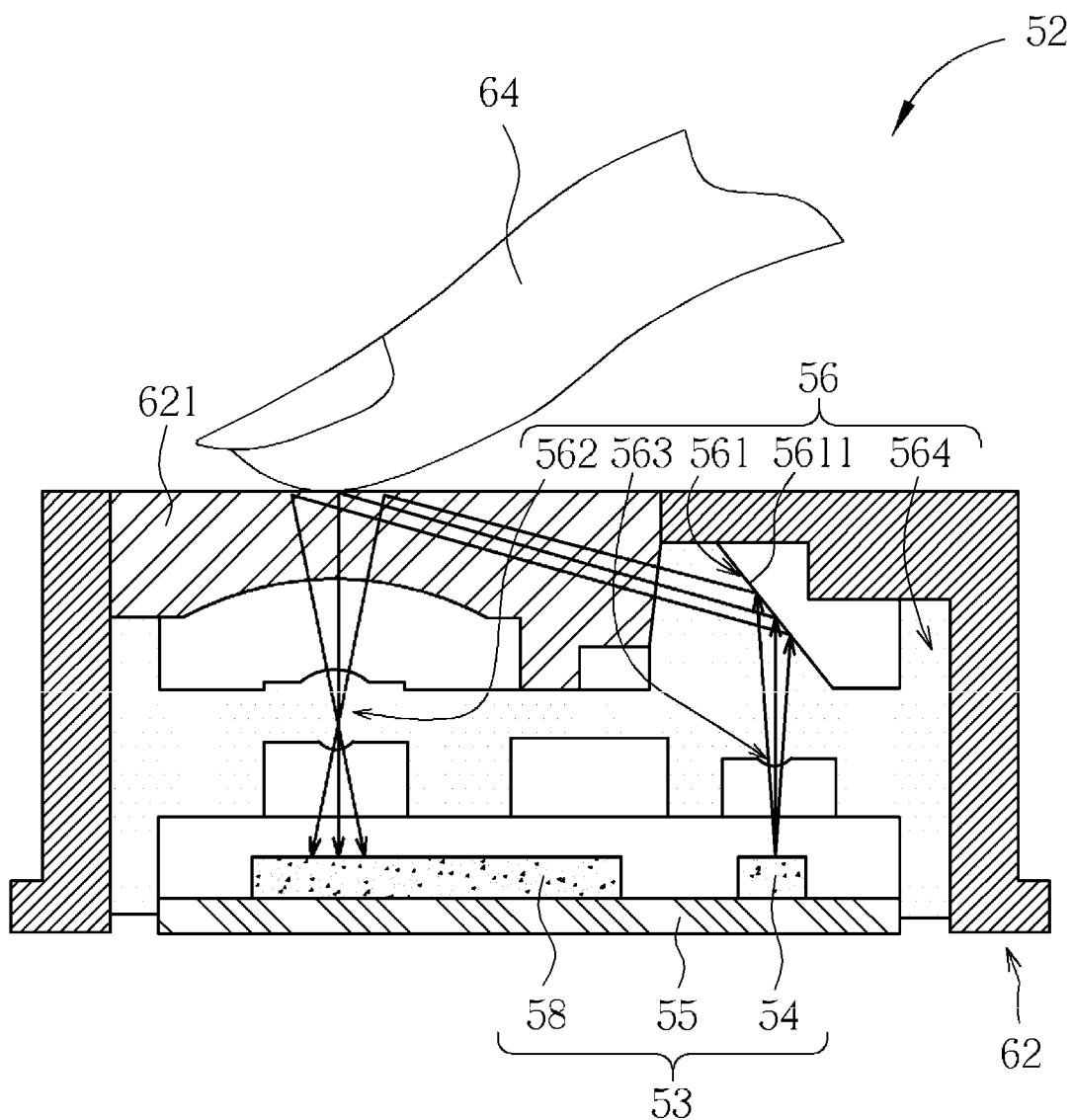
FIG. 2 is an inner structure diagram of an optical pointing device according to the preferred embodiment of the present invention.
Figure 3:
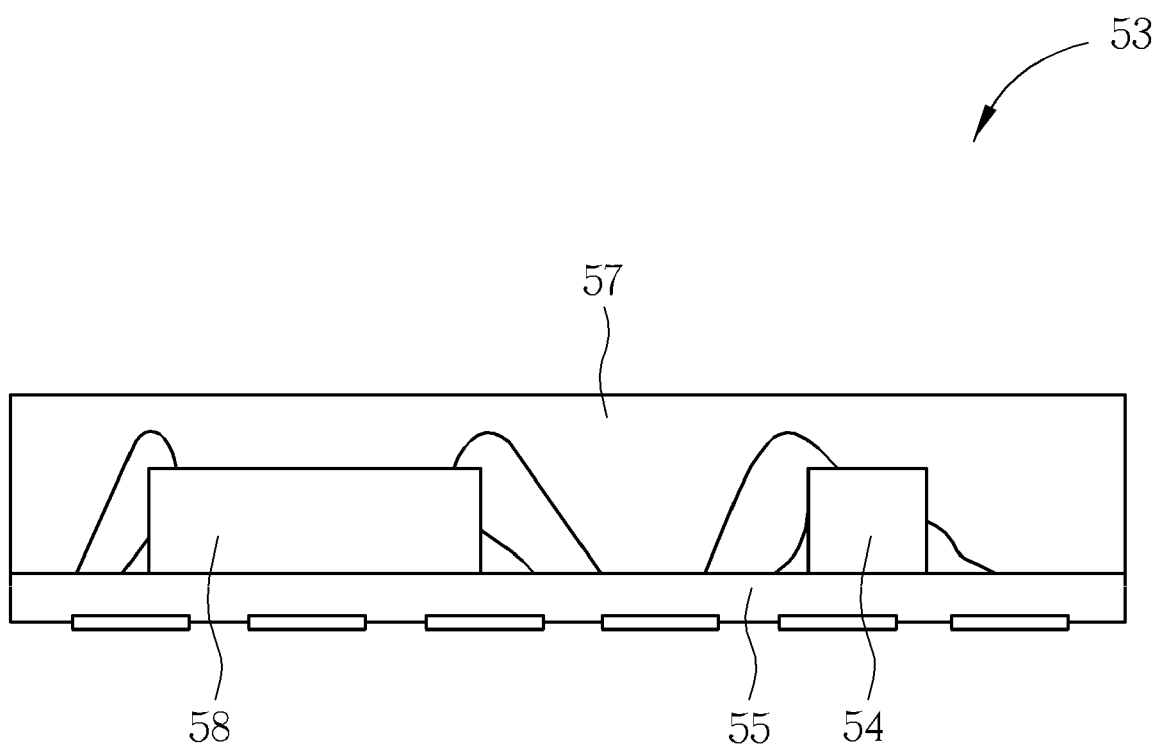
FIG. 3 and FIG. 4 are diagrams of a sensing component according to different embodiments of the present invention.
Figure 4:
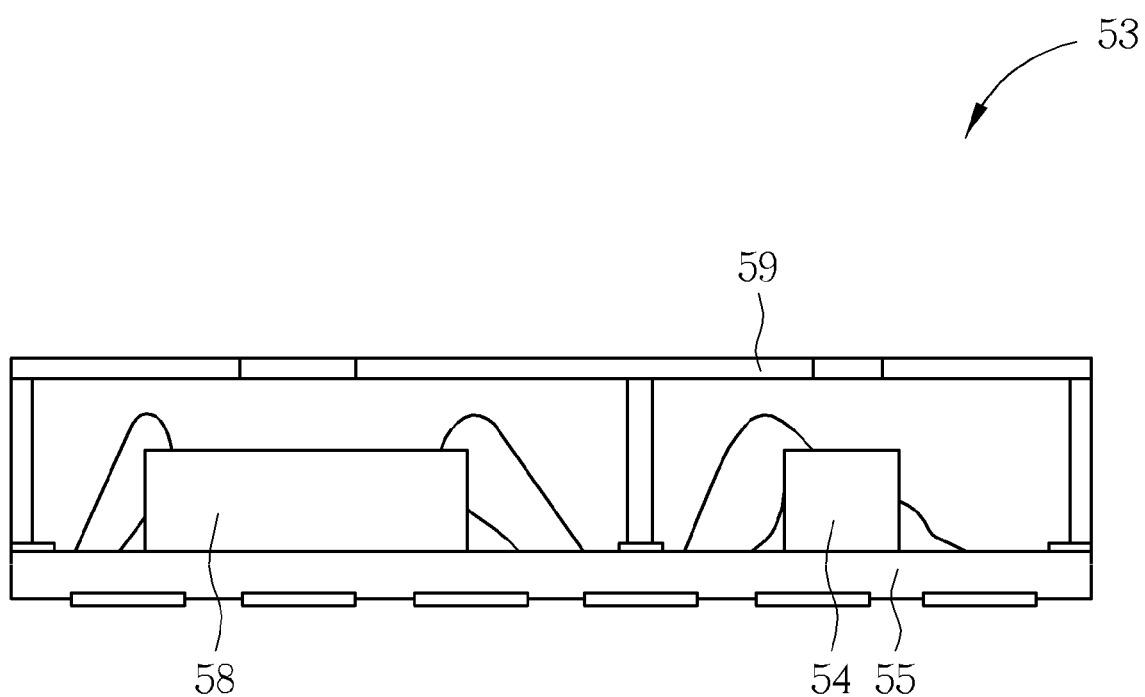

Please refer to FIG. 2. FIG. 2 is an inner structure diagram of the optical pointing device 52 according to the preferred embodiment of the present invention. The optical pointing device 52 further includes a cover 62 for covering and positioning the light emitting module 54, the light guiding component 56, the light sensing module 58, and so on. The cover 62 includes a transparent part 621 where light is capable of passing through. The transparent part 621 of the cover 62 is made of material with light transmissivity. For example, the transparent part 621 can be made of material with infrared transmissivity or dyeing plastic material, such as plastic mixed with dyeing powder. The light emitting module 54 can be a light emitting chip. The sensing component 56 further includes a substrate 55 for supporting the light emitting module 54 and the light sensing module 58. The light emitting module 54 can be an optoelectronic semiconductor chip, such as a light emitting diode or a laser diode. The light emitting module 54 can be disposed on the substrate 55 at different packaging methods. For example, the light emitting module 54 can be a light emitting chip with a plastic leaded chip carrier (PLCC) packaging process or with a surface mounting device (SMD) packaging process. Please refer to FIG. 3 and FIG. 4. FIG. 3 and FIG. 4 are diagrams of the sensing component 53 according to different embodiments of the present invention. As shown in FIG. 3, the light emitting module 54 and the light sensing module 58 are disposed on the substrate 55 respectively. The sensing component 53 further includes an encapsulation 57 for covering the light emitting module 54 and the light sensing module 58. The encapsulation 57 can be made of epoxy resin or silica gel material and can include fluorescent material, scattering material, pigment, and so on. The encapsulation 57 can protect the light emitting module 54 and the light sensing module 58. In another embodiment, as shown in FIG. 4, the sensing component 53 can include a lid 59 for separating and covering the light emitting module 54 and the light sensing module 58 for protecting the light emitting module 54 and the light sensing module 58.

The light guiding component 56 is installed inside the cover 62. The light guiding component 56 includes a reflecting part 561, a condensing part 562, a refracting part 563, and a fixing structure 564. The reflecting part 561 can be a prism structure. A chamber is formed between the reflecting part 561 and the cover 62. The condensing part 562 can be a prism structure. Two surfaces of the condensing part 562 respectively facing the transparent part 621 of the cover 62 and the light sensing module 58 are convex surfaces, and a surface of the cover 62 facing the condensing part 562 is a concave surface. A chamber is formed between the condensing part 562 and the cover 62, and a chamber is formed between the condensing part 562 and the sensing component 53. The refracting part 563 can be a prism structure. A surface of the refracting part 563 facing the light emitting module 54 is a convex surface. A chamber is formed between the refracting part 563 and the sensing component 53. The reflecting part 561 is disposed on a side of the light emitting module 54 for reflecting the light emitted from the light emitting module 54 to the transparent part 621 of the cover 62. The refracting part 563 is disposed on an optical path between the light emitting module 54 and the reflecting part 561 for refracting the light emitted from the light emitting module 54 to the reflecting part 561. An angle between a reflecting surface 5611 of the reflecting part 561 and the refracting part 563 is less than 90 degrees. The condensing part 562 is disposed on an optical path between the cover 62 and the light sensing module 58 for condensing light transmitted from the transparent part 621 of the cover 62 to the light sensing module 58. The fixing structure 564 is disposed outside the reflecting part 561, the refracting part 562, and the refracting part 563. The fixing structure 564 combines with the cover 62 and the substrate 55 so as to fix the light guiding component 56 and the sensing component 53 inside the cover 62.

The inventive characteristic of the present invention is that reflecting part 561, the refracting part 562, the refracting part 563, and the fixing structure 564 are integrated monolithically. That is, the reflecting part 561, the refracting part 562, the refracting part 563, and the fixing structure 564 are integrated as a single optical structure. The working principle of the light guiding component 56 is introduced as follows. First, the light emitting module 54 emits light to the refracting part 563, and the refracting part 563 refracts the light emitted from the light emitting module 54 to the reflecting part 561. The reflecting part 561 reflects the light refracted from the refracting part 563 to the transparent part 621 of the cover 62. The light can pass through the transparent part 621 of the cover 62 so as to emit out of the cover 62. When a shelter 64, such as a user's finger, moves on the cover 62, the shelter 64 blocks the light emitting out of the cover 62 and reflects the light into the cover 62. Then the condensing part 562 disposed on an optical path between the transparent part 621 of the cover 62 and the light sensing module 58 condenses the light reflected by the shelter 64 via the transparent part 621 to the light sensing module 58. The light sensing module 58 can sense the light condensed by the condensing part 562 so as to generate a corresponding sensing signal. The control unit 60 can control operation of the electronic apparatus 50 according to the sensing signal transmitted from the light sensing module 58. For example, the light sensing module 58 can trace reflected light at different positions, and the control unit 60 electrically connected to the light sensing module 58 can analyze the image corresponding to the sensing result for calculating motion of the shelter 64 sheltering the optical pointing device 52, such as a user's finger, so as to control the operation of the electronic apparatus 50.

In conclusion, the reflecting part 561, the refracting part 562, the refracting part 563, and the fixing structure 564 are integrated monolithically in the present invention. That is, the reflecting part 561, the refracting part 562, the refracting part 563, and the fixing structure 564 are integrated as a single optical structure so as to simplify optical structure and reduce optical components for reducing assembly tolerance and manufacturing cost. Furthermore, the fixing structure 564 for fixing the light guiding component 56 and the sensing component 53 inside the cover 62 is integrated with the light guiding component 56 monolithically so that there is no need to apply additional fixing structure for simplifying mechanical design. In addition, the part or whole cover 62 can be made of transparent material, and there is no need to embed a transparent component so as to simplify optical structure for reducing assembly tolerance and manufacturing cost. The optical components of the light guiding component 56 are not limited to above-mentioned components, and the assembly of the optical components integrated monolithically is within the scope of the present invention.

In contrast with the prior art, the optical components and the fixing structure of the optical pointing device are integrated monolithically in the present invention so as to simplify optical structure and reduce optical components for reducing assembly tolerance and manufacturing cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical pointing device comprising:
    a cover comprising a transparent part where light passes through;
    a sensing component installed inside the cover, the sensing component comprising:
        a light emitting module for emitting light;
        a light sensing module for sensing light transmitted from the transparent part so as to generate a corresponding sensing signal; and
        a substrate for supporting the light emitting module and the light sensing module; and
    a light guiding component installed between the sensing component and the cover, the light guiding component comprising:
        a reflecting part for reflecting the light emitted from the light emitting module to the transparent part;
        a condensing part integrated with the reflecting part monolithically for condensing light transmitted from the transparent part to the light sensing module, the condensing part being a prism structure, two surfaces of the condensing part respectively facing the transparent part of the cover and the light sensing module being convex surfaces, a surface of the cover facing the condensing part being a concave surface, a chamber being formed between the condensing part and the cover, and a chamber being formed between the condensing part and the sensing component; and
        a fixing structure monolithically integrated with the reflecting part and the condensing part to form a single integral and gaplessly continuous optical structure, for combining with the cover and the substrate so as to fix the light guiding component and the sensing component inside the cover;
    wherein the light emitted from the light emitting module is reflected to the transparent part by the reflecting part and then reflected back to the transparent part and the condensing part by a shelter disposed above the cover, and the condensing part is for condensing the light transmitted from the transparent part to the light sensing module.

2. The optical pointing device of claim 1 wherein the transparent part of the cover is made of material with infrared transmissivity or dyeing plastic material.

3. The optical pointing device of claim 1 wherein the light emitting module is a light emitting chip.

4. The optical pointing device of claim 3 wherein the light emitting chip is a light emitting diode (LED) or a laser diode.

5. The optical pointing device of claim 3 wherein the light emitting chip is a light emitting chip with a plastic leaded chip carrier (PLCC) packaging process or with a surface mounting device (SMD) packaging process.

6. The optical pointing device of claim 1 wherein the sensing component further comprises an encapsulation for covering the light emitting module and the light sensing module.

7. The optical pointing device of claim 6 wherein the encapsulation is made of epoxy resin or silica gel material.

8. The optical pointing device of claim 1 wherein the sensing component further comprises a lid for covering the light emitting module and the light sensing module.

9. The optical pointing device of claim 1 wherein the light guiding component further comprises a refracting part integrated with the reflecting part and the condensing part monolithically and disposed on an optical path between the light emitting module and the reflecting part for refracting the light emitted from the light emitting module to the reflecting part, an angle between a reflecting surface of the reflecting part and the refracting part is less than 90 degrees, a surface of the refracting part facing the light emitting module is a convex surface, and a chamber is formed between the refracting part and the sensing component.

10. The optical pointing device of claim 1 wherein the reflecting part is a prism structure, and a chamber is formed between the reflecting part and the cover.

11. The optical pointing device of claim 1 being an optical joystick or an optical touch device.

12. An electronic apparatus comprising:
    an optical pointing device comprising:
        a cover comprising a transparent part where light passes through;
        a sensing component installed inside the cover, the sensing component comprising:
            a light emitting module for emitting light;
            a light sensing module for sensing light transmitted from the transparent part so as to generate a corresponding sensing signal; and
            a substrate for supporting the light emitting module and the light sensing module; and
        a light guiding component installed between the sensing component and the cover, the light guiding component comprising:
            a reflecting part for reflecting the light emitted from the light emitting module to the transparent part;
            a condensing part integrated with the reflecting part monolithically for condensing light transmitted from the transparent part to the light sensing module, the condensing part being a prism structure, two surfaces of the condensing part respectively facing the transparent part of the cover and the light sensing module being convex surfaces, a surface of the cover facing the condensing part being a concave surface, a chamber being formed between the condensing part and the cover, and a chamber being formed between the condensing part and the sensing component; and
            a fixing structure monolithically integrated with the reflecting part and the condensing part to form a single integral and gaplessly continuous optical structure, for combining with the cover and the substrate so as to fix the light guiding component and the sensing component inside the cover; and
    a control unit electrically connected to the light sensing module for controlling operation of the electronic apparatus according to the sensing signal transmitted from the light sensing module;
    wherein the light emitted from the light emitting module is reflected to the transparent part by the reflecting part and then reflected back to the transparent part and the condensing part by a shelter disposed above the cover, and the condensing part is for condensing the light transmitted from the transparent part to the light sensing module.

13. The electronic apparatus of claim 12 wherein the transparent part of the cover is made of material with infrared transmissivity or dyeing plastic material.

14. The electronic apparatus of claim 12 wherein the light emitting module is a light emitting chip.

15. The electronic apparatus of claim 14 wherein the light emitting chip is a light emitting diode or a laser diode.

16. The electronic apparatus of claim 14 wherein the light emitting chip is a light emitting chip with a plastic leaded chip carrier packaging process or with a surface mounting device packaging process.

17. The electronic apparatus of claim 12 wherein the sensing component further comprises an encapsulation for covering the light emitting module and the light sensing module.

18. The electronic apparatus of claim 17 wherein the encapsulation is made of epoxy resin or silica gel material.

19. The electronic apparatus of claim 12 wherein the sensing component further comprises a lid for covering the light emitting module and the light sensing module.

20. The electronic apparatus of claim 12 wherein the light guiding component further comprises a refracting part integrated with the reflecting part and the condensing part monolithically and disposed on an optical path between the light emitting module and the reflecting part for refracting the light emitted from the light emitting module to the reflecting part, an angle between a reflecting surface of the reflecting part and the refracting part is less than 90 degrees, a surface of the refracting part facing the light emitting module is a convex surface, and a chamber is formed between the refracting part and the sensing component.

21. The electronic apparatus of claim 12 wherein the reflecting part is a prism structure, and a chamber is formed between the reflecting part and the cover.

* * * * *